US00RE35159E

United States Patent [19]

Brunker et al.

[11] E Patent Number: Re. 35,159

[45] Reissued Date of Patent: Feb. 20, 1996

[54] ELECTRICAL CONNECTORS

[75] Inventors: David L. Brunker; John E. Lopata, both of Naperville, Ill.

[73] Assignee: Molex Incorporated, Lisle, Ill.

[21] Appl. No.: 144,863

[22] Filed: Oct. 28, 1993

Related U.S. Patent Documents

Reissue of:

[64] Patent No.: 5,102,353
Issued: Apr. 7, 1992
Appl. No.: 711,231
Filed: Jun. 6, 1991

[51] Int. Cl.[6] ..... H01R 13/648

[52] U.S. Cl. ..... 439/608; 439/108

[58] Field of Search ..... 439/79, 108, 607, 439/609, 610

[56] References Cited

U.S. PATENT DOCUMENTS

| | | | |
|---|---|---|---|
| 2,804,601 | 8/1957 | Harthman et al. | 439/608 |
| 4,340,265 | 7/1982 | Ott et al. | 339/14 R |
| 4,571,014 | 2/1986 | Robin et al. . | |
| 4,702,707 | 10/1987 | Hillbish | 439/80 |
| 4,846,711 | 7/1989 | Kobler et al. | 439/63 |
| 4,846,727 | 7/1989 | Glover et al. | 439/108 X |
| 5,006,236 | 11/1991 | Broeksteeg | 439/108 X |
| 5,018,985 | 4/1991 | Moore | 439/174 |
| 5,046,952 | 9/1991 | Cohen et al. | 439/63 |
| 5,055,068 | 10/1991 | Machura et al. | 439/581 |
| 5,104,341 | 4/1992 | Gilissen et al. | 439/608 |
| 5,174,770 | 12/1992 | Sasaki et al. | 439/108 |

FOREIGN PATENT DOCUMENTS

| | | |
|---|---|---|
| 3511344A1 | 10/1986 | Germany . |
| 2219148 | 11/1989 | United Kingdom . |
| 2219148 | 11/1989 | United Kingdom . |
| WO8802560 | 4/1988 | WIPO . |

*Primary Examiner*—Gary F. Paumen
*Attorney, Agent, or Firm*—Charles S. Cohen

[57] ABSTRACT

An electrical connector is disclosed which includes a dielectric housing with passages for receiving a plurality of signal terminals. A common ground member is disposed in the dielectric housing with portions thereof disposed between the individual signal terminals. The ground member has a passage for receiving a ground terminal.

37 Claims, 3 Drawing Sheets

FIG.1
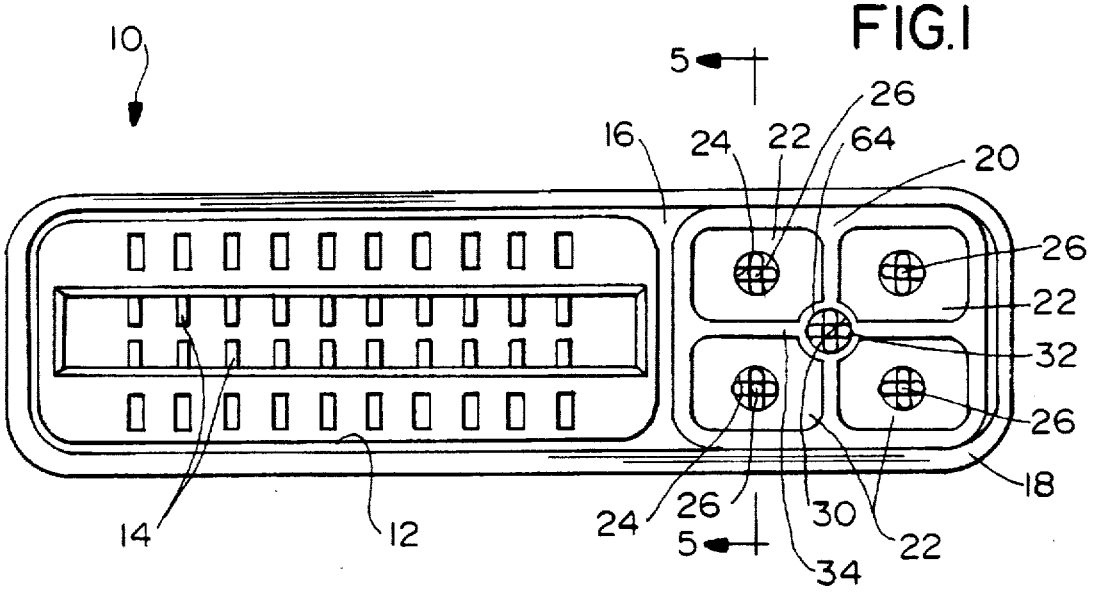
FIG.2
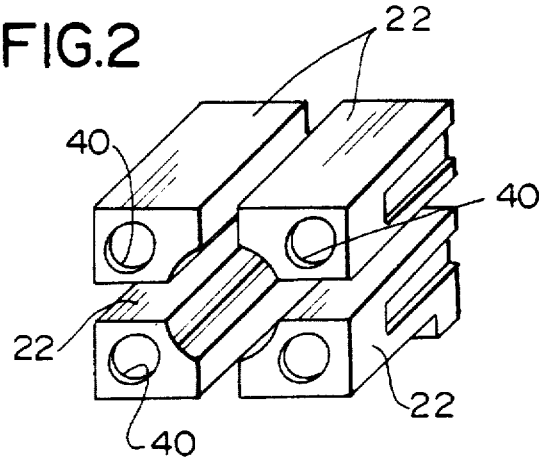
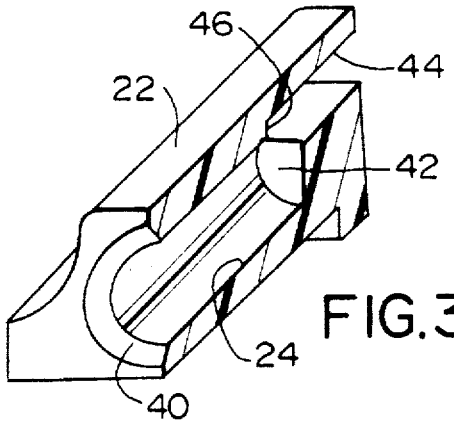
FIG.3
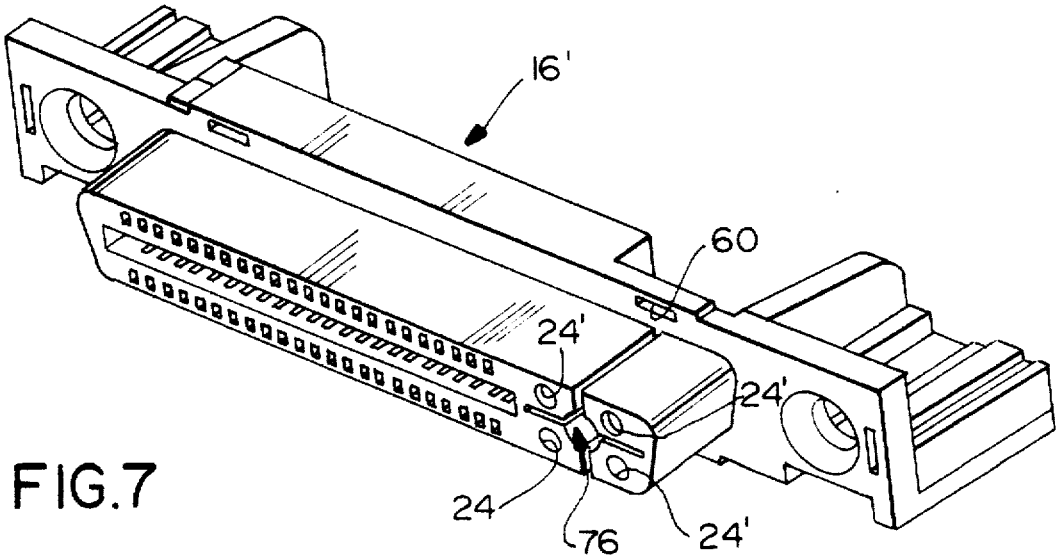
FIG.7

FIG.8
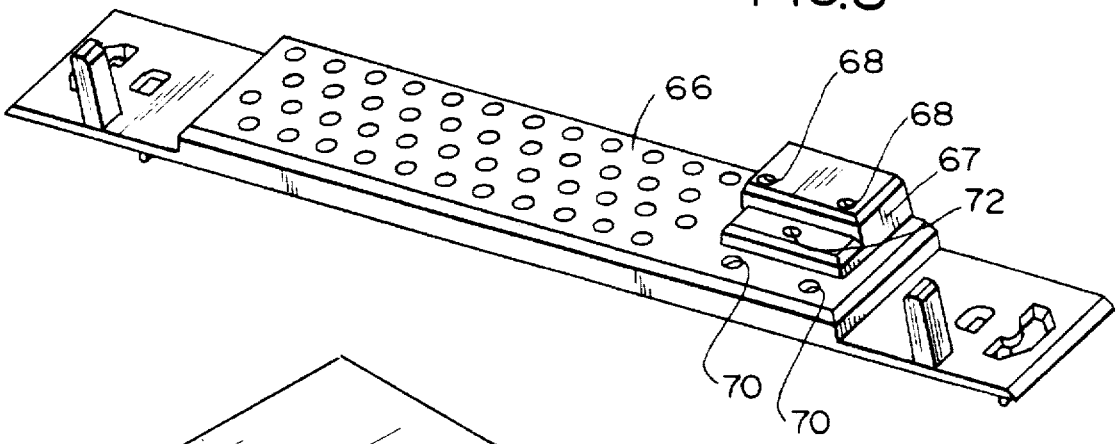
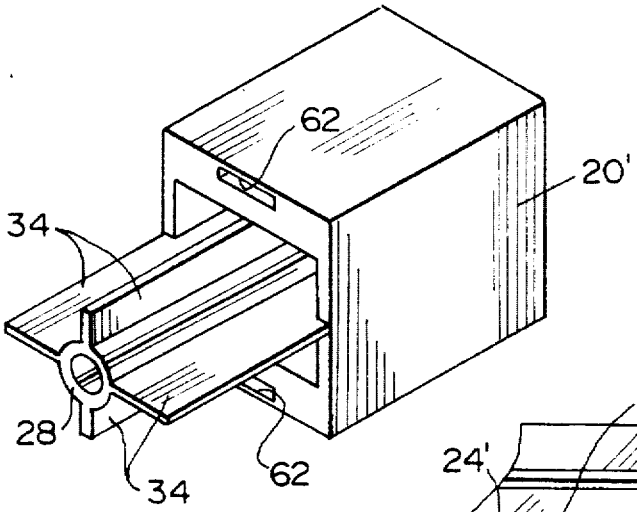
FIG.9
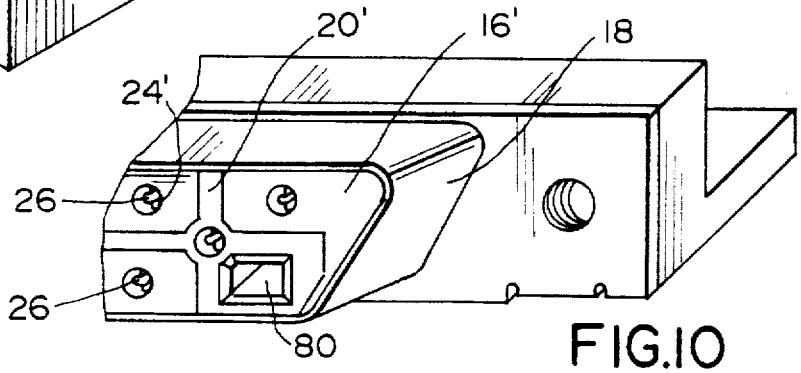
FIG.10
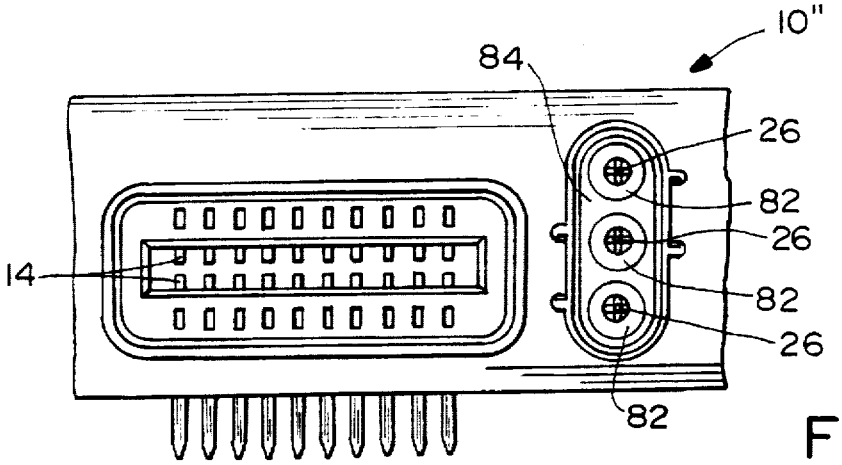
FIG.11

ELECTRICAL CONNECTORS

Matter enclosed in heavy brackets [ ] appears in the original patent but forms no part of this reissue specification; matter printed in italics indicates the additions made by reissue.

FIELD OF THE INVENTION

This invention generally relates to the art of electrical connectors and, particularly, to a hybrid electrical connector for accommodating both high frequency transmission as well as lower frequency transmissions.

BACKGROUND OF THE INVENTION

Electrical connectors are used to interconnect signal transmission lines to printed circuit boards, other electronic devices or to other complementary connectors. The transmission lines transmit signals through a plurality of conductors which, preferably, are physically separated and electromagnetically isolated along their length.

In the electronics industry, particularly the computer industry, the predominant system embodies a plurality of plug-in type connectors in mating engagement with receptacle connectors on the computer, its main printed circuit board or other electronic devices. The transmission lines typically include coaxial electrical cables, either in round or flat form, and round cables are presently being used predominantly in relatively high frequency applications between various system components.

Classical coaxial designs derive their characteristic impedance from the geometrical relationship between the inner signal conductors and the outer shield member and the intervening dielectric constant. For a given impedance, signal conductor size and dielectric material, an overall outside dimension is defined. In order to increase signal density and reduce the overall outside dimensions of a transmission line connector system, alternate geometries and/or dielectric materials are required.

For data processing purposes, cables usually utilize twisted pairs of conductors to achieve the necessary characteristics, particularly impedance control and cross talk control. Coaxial cables are used in singular conductor configuration in high frequency applications, such as to a high-speed video monitor. Most often, the lower speed data transmission lines are separated from the high speed signal transmission lines. Consequently, different electrical connectors are often used for the lower speed data transmission lines than for the high speed signal lines. This adds to the problem of requiring multiple connectors in ever-increasing miniaturized and high density applications. This invention is directed to solving such problems by providing an electrical connector which terminates both high speed signal transmission lines and the slower data transmission lines in a unique manner providing a common ground for the signal transmission lines.

SUMMARY OF THE INVENTION

An object, therefore, of the invention is to provide a new and improved system, as well as an electrical connector, for interconnecting signal transmission lines in electronic devices, such as computers or the like.

According to an aspect of the invention, an electrical connector is provided as an interface between a plurality of high speed transmission lines and an electronic device, particularly a printed circuit board of the device. The connector includes a common ground system for all of the high frequency conductors to reduce the number of interconnections predominant in the prior art and to increase signal density while maintaining a desired impedance level. As disclosed herein, the interconnection with the high frequency conductors is combined with terminals for interconnection to a plurality of slower data transmission lines to create a matrix-type hybrid connector.

Other objects, features and advantages of the invention will be apparent from the following detailed description taken in connection with the accompanying drawings.

BRIEF DESCRIPTION OF THE DRAWINGS

The feature of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a front elevational view of a connection embodying the present invention;

FIG. 2 is a perspective view of the insulators used in the connector of FIG. 1;

FIG. 3 is a vertical section through one of the insulators shown in FIG. 2, namely the bottom right-hand insulator of FIG. 2;

FIG. 7 is a perspective view of the housing utilized in FIG. 6;

FIG. 8 is a perspective view of a tail aligner that could be utilized with the housing of FIG. 7 or the connector of FIG. 1;

FIG. 9 is a perspective view of a ground member utilized in FIG. 6;

FIG. 10 is a perspective view showing another alternative embodiment of the invention as compared to FIG. 6; and FIG. 11 is an elevational view of a further embodiment of the invention in comparison to the embodiments illustrated in FIGS. 1 and 6.

DETAILED DESCRIPTION OF THE PREFERRED EMBODIMENT

Figure 5:
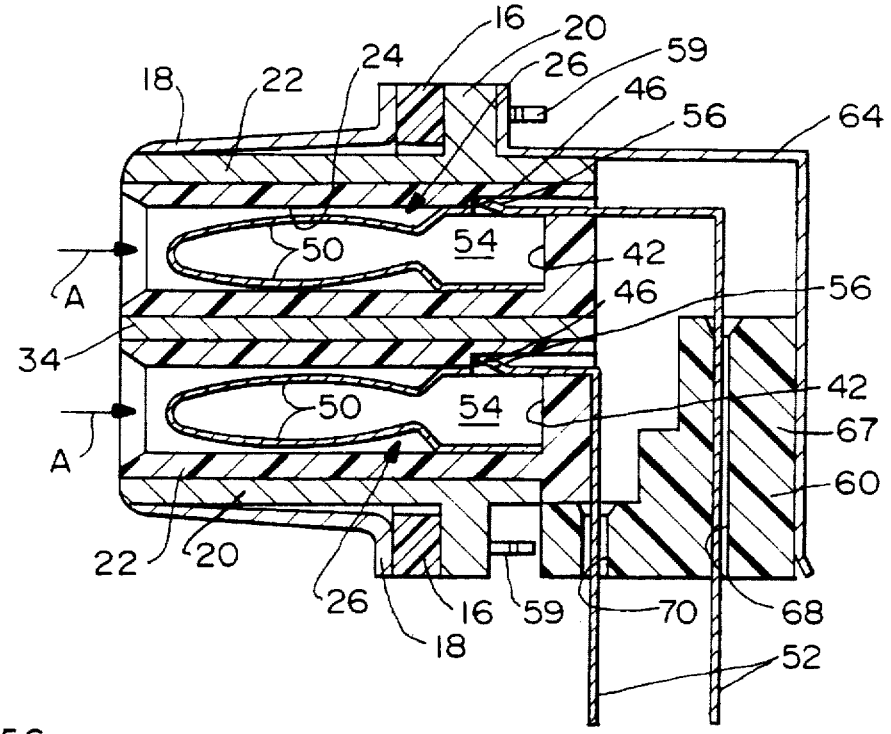
FIG. 5 is a vertical section taken generally along line 5—5 of FIG. 1.

Referring to the drawings in greater detail and first to FIG. 1, the invention contemplates a hybrid electrical connector that terminates both the conductors for data transmission lines and the conductors for data transmission lines and the conductors of high frequency transmission lines. More particularly, electrical connector 10, includes receptacle portion 12 having contact portions 14 of a plurality of terminals mounted therein exposed for engagement with appropriate contacts of a complementary mating male or plug-in connector. The left-hand portion or section of electrical connector 10 shown in FIG. 1 forms a standard data connector. However, the right-hand portion or section of connector 10 provides a high frequency connector.

Still referring to FIG. 1, connector 10 includes a dielectric housing 16 surrounded by a conductive shield 18 which spans substantially the entire length of the connector. An alternate embodiment of the housing is shown in FIG. 7. A single or common ground member 20 of die-cast metal material, or the like, surrounds four quadrants which are filled by separate insulator members 22. Each insulator member 22 has a passage 24 for receiving signal contacts or terminals 26. Such passage 24 can be positioned within insulator 22 and with respect to ground member 20 in order to provide controlled impedance. Ground member 20 has a central circular portion 28 surrounding a passage 30 for receiving a ground contact or terminal 32. Ground member 20 is shaped to have spokes or webs 34 dividing the interior of the ground member into the quadrants. Therefore, it can be seen in FIG. 1 that all of signal contacts 26 and ground contact 32 are surrounded by the single ground member 20. This is in striking contrast to prior systems wherein typical coaxial interface designs use separate or discrete ground connections which consume a considerable amount of space and require separate terminations. With the single ground member 20 surrounding all of the contacts, a common ground plane is provided to control impedance, emissions of radiation and cross talk between the contacts.

FIG. 2 shows all four insulators 22 in a perspective depiction as they are located within ground member 20. FIG. 3 shows a section through one of the insulators 22 to illustrate the configuration of passage 24 therethrough. It can be seen that the passage has an entry end 40 for receiving a contact of a complementary connector, a back wall 42, a through passage portion 44 and a shoulder 46.

Figure 4:
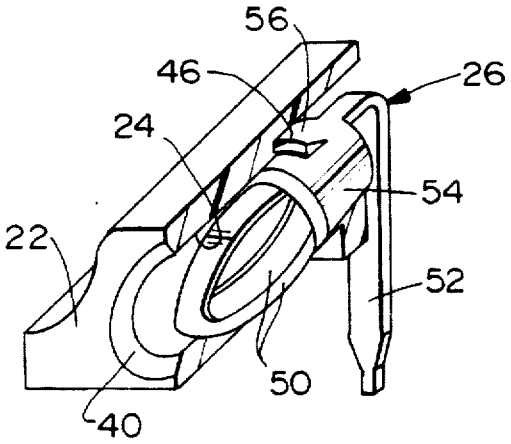
FIG. 4 is a perspective view similar to that of FIG. 3, with a contact loaded into the insulator.

With the above-described configuration of the interior passages of each insulator 22 in relation to FIG. 3, reference is made to FIGS. 4 and 5 wherein a signal contact, generally designated 26, is shown positioned in passages 24. Each contact 26 includes a contact end 50 and a solder tail end 52. The contact end is disposed in passage 24 and the solder tail is provided for interconnection to a circuit trace on a printed circuit board as is known in the art. Contact end 50 is fabricated by a plurality of contact spring arms which are "crowned" for high hertzian interfacing with a receptacle-contact of the complementary connector.

Each contact 26 is securely locked into position within its respective insulator 22 by means of a base portion 54 of the contact engaging back wall 42 of the insulator, and the base portion is provided with a locking barb 56 for snapping behind shoulder 46 of its insulator. In assembly of contacts 26 into insulators 22, solder tail portion 52 initially extends parallel to the axis of the contact end 50 so that the contacts can be loaded into insulators 22 in the direction of arrows "A" in FIG. 5. When base portions 54 of the contacts engage back walls 42 of the insulators, locking barbs 56 snap behind shoulders 44 of the insulators. Solder tails 52 then are bend downwardly as shown in FIGS. 4 and 5.

FIG. 5 also shown the positioning of shield 18 and how it surrounds housing 16 and common ground member 20. Shield 18 includes locking projections 59 which extend through openings 60 (FIG. 7) in the dielectric housing 16, openings 62 (FIG. 9) in the die cast ground member 20 and through an opening in back cover shielding member 64, which is made from a conductive material. These components are dimensioned so that the shield 18, ground member 20 and back cover 64 are mechanically and electrically secured to complete the ground circuit between them. Back cover 64 covers and shields the rear portion of the connector and the tail portions of the terminals.

Solder tail portions 52 are shown extending through passages in tail aligner 66. As can be seen in FIGS. 1 and 5, the solder tail portions 52 of the terminals 62 have three different lengths. The longest solder tails are connected to the upper terminals 26 and extend through holes 68 in the tail aligner. The shortest solder tails are connected to the lower terminals 26 and extend through holes 70 in the tail aligner. The solder tail of ground terminal 32 has a length between those of the upper terminals and lower terminals and extend through hole 72 in the tail aligner. In order to compensate for the resulting difference in path lengths, the tail aligner (FIGS. 5 and 8) may include stepped portion 67. The stepped tail aligner 66 is dimensioned so as to balance the impedance of each line to a desired value.

Figure 6:
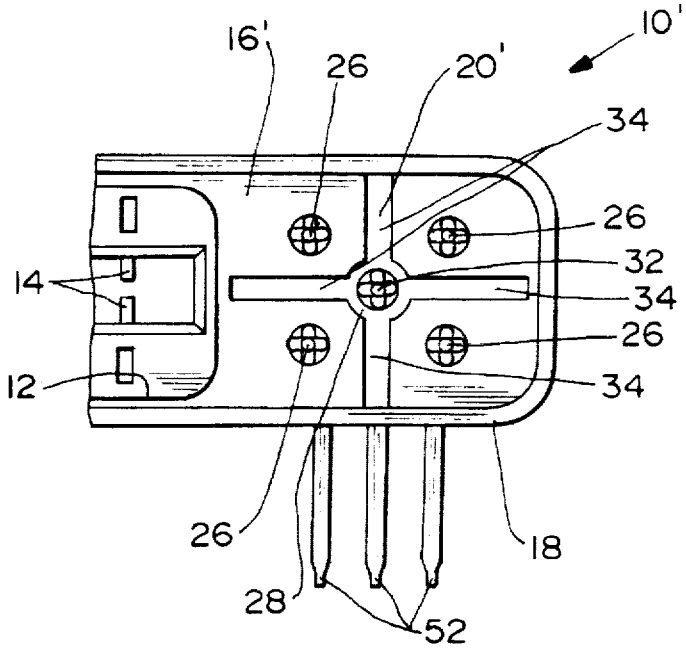
FIG. 6 is a fragmented elevational view of an alternate embodiment of the invention in comparison to that shown in FIG. 1.

FIG. 6 shows an alternate form of the invention in regard to the right-hand end or high frequency portion of electrical connector 10 described in relation to and in comparison to FIG. 1. In FIG. 6, the connector is designated 10' and like numerals have been applied to designate like components in comparison to the embodiment of FIG. 3. Similar but not identical components are designated with a "'".

More particularly, electrical connector 10' also includes a common ground member, generally designated 20' for surrounding ground contact 32 and electrically isolating contacts 26. Again, ground member 20' provides a common ground plane to control impedance, emissions of radiation and cross-talk between the contacts. In this embodiment, it can be seen that the separate insulators 58 of the embodiment of FIG. 1 have been eliminated, and main dielectric housing 16' extends entirely about the signal contacts. The housing 16' is shown isolated in FIG. 7. The housing has passages for 74 for receiving the signal contacts 26. The interior of the passages may be similar to the configuration of passages 24 (FIG. 3) in insulators 22.

In the embodiment of FIG. 6, common ground member 20' includes a central circular portion 28 (FIG. 9) surrounding ground contact 32, and four spoke portions 34 radiate outwardly from circular portion 28 between signal contacts 26. As seen in FIG. 7, housing 16 has internal passage means 76 of a shape corresponding to the cross-section of the spoked portion of common ground member 20'. Although the ground member 20' in the embodiment of FIG. 6 does not completely surround signal contacts 26 as does ground member 20 (FIG. 1), the ground member 20' is the closest conductor to each signal terminal 26 and therefore acts as the primary ground reference in order to control the impedance. It further isolates each of the signal contacts from the other signal contacts. In addition, this embodiment has the advantage of using main housing 16' as the insulating means surrounding the signal contacts 26 which simplifies the assembly of the conductor. It should be understood that in many applications, only three signal contacts 26 would be provided, such as the "red", "green" and "blue" signals to a video monitor. The passage in the fourth quadrant, for such applications, could be provided for other functions, such as a keying receptacle 80 (FIG. 10). Such passage could either be formed in the ground member 20' or in the dielectric housing 16'. A plug (not shown) dimensioned to mate only with the keying receptacle is provided on the connector that mates with connector 10'.

FIG. 11 shows a further embodiment of the invention wherein an electrical connector 10" (corresponding to connectors 10 and 10') has the three high frequency signal contacts arranged in a vertically stacked array. Each contact is surrounded by a cylindrical insulator 82 which, in turn, is surrounded by a common conductive ground member 84 corresponding in function to the ground members 20 and 20' in the embodiments of FIGS. 1 and 8, respectively. It can be seen that no separate ground contact (32 in FIGS. 1 and 6) is incorporated in this embodiment.

It will be understood by those skilled in the art that connectors 10, 10' and 10" will be utilized with similarly configured male connectors which are not described herein.

It will further be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

[1. In a shielded electrical connector for mating with another electrical connector along a mating axis, said shielded connector having dielectric housing, an outer conductive shield member generally surrounding a mating portion of said housing, a plurality of terminal receiving openings in said housing for receiving terminals therein, and a plurality of terminals positioned in said openings, wherein the improvement comprises:

a one-piece common conductive ground member mounted to said housing with portions of the ground member disposed between the individual terminals; and access means in said housing for permitting insertion of said one-piece ground member through an outer surface of said housing.]

2. [The] *In a shielded* electrical connector [of claim 1 wherein] *for mating with another electrical connector along a mating axis, said shielded connector having a dielectric housing, an outer conductive shield member generally surrounding a mating portion of said housing, a plurality of terminal receiving openings in said housing for receiving terminals therein, and a plurality of terminals positioned in said openings, wherein the improvement comprises:*

*a one-piece common conductive ground member mounted to said housing with portions of the ground member disposed between the individual terminals,* said common ground member [includes] *including* a portion thereof having passage means therethrough for receiving and surrounding a ground terminal*; and*

*access means in said housing for permitting insertion of said one-piece ground member through an outer surface of said housing.*

3. The electrical connector of claim 2 wherein said portion of the common ground member for receiving the ground terminal is located centrally of the common ground member.

4. The electrical connector of claim 3 wherein said common ground member includes a plurality of spoke-like portions radiating outwardly of the ground terminal and disposed between respective adjacent ones of the [signal] terminals.

5. The electrical connector of claim 4 wherein said common ground member has peripheral portions joining the distal ends of the spoke-like portions whereby the common ground member surrounds each of the [signal] terminals.

6. The electrical connector of claim [1] *21* wherein a portion of said housing is a unitary piece and said access means permits insertion of said [one-piece ground member] *shielding means* along an axis generally parallel to said mating axis and into said unitary piece.

[7. The electrical connector of claim 6 wherein said common ground member includes a portion thereof having passage means therethrough for receiving and surrounding a ground terminal.]

[8. The electrical connector of claim 7 wherein said portion of the common ground member for receiving the ground terminal is located centrally of the common ground member.]

[9. The electrical connector of claim 8 wherein said common ground member includes a plurality of spoke-like portions radiating outwardly of the ground terminal and disposed between respective adjacent ones of the signal contacts.]

[10. The electrical connector of claim 9 wherein said common ground member has peripheral portions joining the distal ends of the spoke-like portions whereby the common ground member surrounds each of the signal contacts.]

[11. The electrical connector of claim 1 wherein said outer conductive shield member is mechanically and electrically connected to said conductive ground member.]

[12. The electrical connector of claim 11 further comprising staking means for mechanically and electrically securing the conductive ground member to the outer shield member.]

13. In a generally rectangular, shielded electrical connector for mating with another electrical connector along a mating axis, said shielded connector including a dielectric housing having a mating face generally perpendicular to said mating axis and a face opposite said mating face, an outer conductive shield member generally surrounding a region of said housing for mating with said another electrical connector, a first portion of said housing having mounted therein a plurality of first terminals in a first given array for interconnection with a plurality of first terminals of said another electrical connector, and a second portion of said housing having mounted therein a plurality of second terminals in a second given array for interconnection with a plurality of second terminals of said another electrical connector, wherein the improvement comprises:

a common conductive ground member mounted to said second portion of said housing with portions of the ground member disposed between the second terminals, *a first portion of said ground member being positioned generally equidistantly between an adjacent first two of said second terminals and radiating outwardly in a first plane that intersects a line extending generally parallel to said mating axis and centrally located with respect to said second terminals and a second portion of said ground member being positioned generally equidistantly between an adjacent second two of said second terminals and radiating outwardly in a second plane that intersects said line*; and slot means in said second portion of said housing extending through one of said faces to permit insertion of said ground member along an axis generally parallel to said mating axis.

14. The electrical connector of claim 13 wherein said slot means extends between said mating face and said opposite face.

[15. The electrical connector of claim 13 wherein said portions of the ground member are positioned generally equidistantly between said second terminals.]

16. The electrical connector of claim 13 wherein said outer conductive shield member is mechanically and electrically connected to said conductive ground member.

17. The electrical connector of claim 16 further comprising staking means for mechanically and electrically securing the conductive ground member to the outer shield member.

18. In a generally rectangular, shielded electrical connector for mating with another electrical connector along a mating axis, said shielded connector including a dielectric housing having a mating face generally perpendicular to said mating axis and a face opposite said mating face, an outer conductive shield member generally surrounding a region of said housing for mating with said another electrical connector, a first portion of said housing having mounted therein a plurality of first terminals in a given array for interconnection with a plurality of first terminals of said another electrical connector, and a second portion of said housing having mounted therein a plurality of second terminals in a given array for interconnection with a plurality of second terminals of said another electrical connector, wherein the improvement comprises:

a conductive ground subassembly positioned at said second portion, said ground subassembly including a common conductive ground member with [portions] *a first portion* of the ground member *being* disposed *generally equidistantly* between *an adjacent first two of* said second terminals *and radiating outwardly in a first plane that intersects a line extending generally parallel to said mating axis and centrally located with respect to said second terminals and a second portion of said ground member being disposed generally equidistantly between an adjacent second two of said second terminals and radiating outwardly in a second plane that intersects said line*, and insulation means disposed between said conductive ground member and said second terminals;

an opening in said housing communicating with said mating face and into which said conductive ground subassembly is inserted; and said outer conductive shield is mechanically and electrically connected to said common conductive ground member.

19. The electrical connector of claim 18 wherein said conductive ground subassembly is positioned within said outer conductive shield member.

20. The electrical connector of claim 18 wherein said opening permits insertion of said ground subassembly along an axis generally parallel to said mating axis.

*21. In a shielded input/output electrical connector for mounting to a printed circuit board having electrically conductive signal and ground traces thereon and for mating with another electrical connector along a mating axis, said shielded connector including a dielectric housing having a mating face generally transverse to said mating axis, an outer conductive shield member generally surrounding a region of the housing for mating with said another electrical connector and for interconnection to at least one of said ground traces on said printed circuit board, at least three high speed terminals defining a first array of terminals in said region of the housing within said shield member, and a plurality of low speed terminals defining a second array of terminals in said region of the housing separate from said first array of terminals, wherein the improvement comprises:*

*said first array of terminals defining a generally circular area;*

*shielding means within said generally circular area including a plurality of conductive planes extending radially outwardly from the center of said circular area between respective adjacent ones of said at least three high speed terminals, each of said three high speed terminals being unshielded by said shielding means in a direction radially outward from said center between its adjacent planes; and*

*access means in said housing for permitting insertion of a portion of said shielding means through an outer surface of said housing for permanent retention therein.*

*22. In a shielded input/output electrical connector as set forth in claim 21, including four of said high speed terminals spaced equidistant about the center of said circular area, and said conductive planes form a cross configuration.*

*23. In a shielded input/output electrical connector as set forth in claim 21, wherein said outer conductive shield member is mechanically and electrically connected to said shielding means.*

*24. In a shielded input/output electrical connector as set forth in claim 23, wherein said outer conductive shield member is located about three sides of said first array of terminals.*

*25. In a shielded input/output electrical connector as set forth in claim 21, further including a conductive member on said connector for mechanically and electrically interconnecting said conductive planes to another of said ground traces.*

*26. In a shielded input/output electrical connector as set forth in claim 21, further including conductive connecting means for mechanically and electrically interconnecting said shielding means to another of said ground traces.*

*27. In an electrical connector assembly having a mating axis, said connector assembly having a dielectric housing means and at least three terminals defining a terminal array in a mating region, each of said three terminals having a mating portion, wherein the improvement comprises:*

*a first shielding means lying in a first plane extending between said mating portions of an adjacent first two of said terminals and a second shielding means lying in a second plane extending between said mating portions of an adjacent second two of said terminals, said first and second planes intersecting in a line that extends generally parallel to said mating axis; and*

*access means in said housing means for permitting insertion of at least a portion of said first and second shielding means through an outer surface of said housing means.*

*28. In an electrical connector assembly as set forth in claim 27, wherein said first and second shielding means form a cross configuration.*

*29. In an electrical connector assembly as set forth in claim 28 wherein said connector assembly includes four of said terminals spaced equidistant from said line.*

*30. In an electrical connector assembly as set forth in claim 27, wherein said connector assembly includes an outer conductive shield member generally surrounding a mating region of said connector assembly, said outer conductive shield member being mechanically and electrically connected to said first and second shielding means.*

*31. In an electrical connector assembly as set forth in claim 27, wherein said first and second shielding means are formed of a unitary member.*

*32. In an electrical connector having a mating axis, said electrical connector having a dielectric housing and at least three terminals, each of said three terminals having a mating portion, wherein the improvement comprises:*

*a group of substantially identical ground and terminal arrays, each array having a terminal and a ground means whereby said group has a plurality of terminals and a plurality of ground means, a portion of said ground means in each array being adjacent said mating portion of said terminal in said array, the mating portion of said terminal in each array being substantially closer to the portion of said ground means of said array that the to mating portion of an adjacent terminal, said plurality of said ground means forming a generally closed shape about a central axis, and said terminals and said ground means being disposed generally equidistantly from said central axis with said*

*portion of each ground means of an array being positioned between said central axis and the terminal of said array.*

*33. The electrical connector of claim 32 wherein said electrical connector includes four terminals with each of said four terminals having a main portion, said group of substantially identical ground and terminal arrays includes said four terminals, and wherein said ground and terminal arrays are symmetrically disposed about said central axis.*

*34. The electrical connector of claim 32 wherein said terminals are located within said closed shape.*

*35. The electrical connector of claim 32 wherein said closed shape is formed of a unitary member.*

*36. In an electrical connector having a mating axis, said electrical connector having a dielectric housing and at least three terminals, each of said three terminals having a mating portion, wherein the improvement comprises:*

*a group of substantially identical ground and terminal arrays including said at least three terminals, each array having one of said terminals and a ground means whereby said group has a plurality of terminals and a plurality of ground means, a portion of said ground means in each array being arcuate and adjacent said mating portion of said terminal in said array, the mating portion of said terminal in each array being substantially closer to the portion of said ground means of said array than to the mating portion of an adjacent terminal, said ground and terminal arrays being disposed about a central axis and said ground means being disposed generally equidistantly from said central axis with said portion of each ground means of an array being positioned between said central axis and the terminal of said array.*

*37. The electrical connector of claim 36 wherein said plurality of said ground means form a generally closed shape positioned about said central axis.*

*38. The electrical connector of claim 37 wherein said terminals are located within said closed shape.*

*39. The electrical connector of claim 37 wherein said closed shape is formed of a unitary member.*

*40. In a shielded electrical connector for mating with another electrical connector along a mating axis, said shielded connector having a dielectric housing with a portion of said housing being a unitary piece, an outer conductive shield member generally surrounding a mating portion of said housing, a plurality of terminal receiving openings in said housing for receiving terminals therein, and a plurality of terminals positioned in said openings, wherein the improvement comprises:*

*a one-piece common conductive ground member mounted to said housing with portions of the ground member disposed between the individual terminals a unitary piece, said common ground member including a portion thereof having passage means therethrough for receiving and surrounding a ground terminal; and*

*access means in said housing for permitting insertion of said one-piece ground member through an outer surface of said housing, said access means permitting insertion of said one-piece ground member along an axis generally parallel to said mating axis and into said unitary piece.*

*41. The electrical connector of claim 40 wherein said portion of the common ground member for receiving the ground terminal is located centrally of the common ground member.*

*42. The electrical connector of claim 41 wherein said common ground member includes a plurality of spoke-like portions radiating outwardly of the ground terminal and disposed between respective adjacent ones of the terminals.*

*43. The electrical connector of claim 42 wherein said common ground member has peripheral portions joining the distal ends of the spoke-like portions whereby the common ground member surrounds each of the terminals.*

*44. The electrical connector of claim 2 wherein said outer conductive shield member is mechanically and electrically connected to said conductive ground member.*

*45. The electrical connector of claim 44 further comprising staking means for mechanically and electrically securing the conductive ground member to the outer shield member.*

* * * * *